_United States Patent_ [19]

Freitag et al.

[11] 4,366,276

[45] Dec. 28, 1982

[54] FLAME-RESISTANT MOULDING MATERIALS BASED ON THERMOPLASTIC AROMATIC POLYESTERS AND POLYESTERS CARBONATES, A PROCESS FOR THEIR PRODUCTION AND THEIR USE IN THE PRODUCTION OF MOULDED BODIES

[75] Inventors: Dieter Freitag; Werner Nouvertné, both of Krefeld; Klaus Reinking, Wermelskirchen; Peter Tacke, Krefeld; Frank Kleiner, Cologne, all of Fed. Rep. of Germany; Manfred Schmidt, New Martinsville, W. Va.

[73] Assignee: Bayer Aktiengesellschaft, Leverkusen, Fed. Rep. of Germany

[21] Appl. No.: 274,387

[22] Filed: Jun. 7, 1981

[30] Foreign Application Priority Data

Jun. 25, 1980 [DE] Fed. Rep. of Germany ....... 3023818
Sep. 19, 1980 [DE] Fed. Rep. of Germany ....... 3035357

[51] Int. Cl.$^3$ .......................... C08K 3/16; C08K 5/34
[52] U.S. Cl. ...................... 524/94; 524/130; 524/157; 524/284; 524/404; 524/413; 524/414; 524/417; 524/437; 524/443; 525/146; 525/151

[58] Field of Search ............... 260/45.7 R, 45.7 SF, 260/45.75 F, 45.8 NB, 45.9 R; 525/151, 146; 528/176, 194; 524/94

[56] References Cited

U.S. PATENT DOCUMENTS

| | | | |
|---|---|---|---|
| 3,775,367 | 11/1973 | Nouvertne | 260/45.9 R |
| 3,940,366 | 2/1976 | Mark | 260/45.7 SF |
| 4,208,489 | 6/1980 | Schmidt et al. | 260/45.7 SF |
| 4,223,100 | 9/1980 | Reinert | 260/45.75 F |
| 4,229,332 | 10/1980 | Kyo et al. | 528/194 |
| 4,238,597 | 12/1980 | Markezich et al. | 528/194 |
| 4,299,756 | 11/1981 | Calundann | 528/194 |

_Primary Examiner_—John Kight, III
_Assistant Examiner_—R. A. White
_Attorney, Agent, or Firm_—Connolly and Hutz

[57] ABSTRACT

Aromatic polyesters and polyestercarbonates based on diphenols and iso- and/or terephthalic acids become flame-proof if admixed with small quantities of ammonium or alkali metal salts of inorganic or organic acids and optionally halophthalimides and optionally polytetrafluoroethylene. The mechanical and chemical properties of the polyester (carbonates) remain unchanged.

6 Claims, No Drawings

FLAME-RESISTANT MOULDING MATERIALS BASED ON THERMOPLASTIC AROMATIC POLYESTERS AND POLYESTERS CARBONATES, A PROCESS FOR THEIR PRODUCTION AND THEIR USE IN THE PRODUCTION OF MOULDED BODIES

This invention relates to flame-resistant moulding materials which contain thermoplastic polyesters or polyester carbonates, based on diphenols and iso- and-/or terephthalic acids, and, as flameproofing agents, ammonium or alkali metal salts and optionally tetrahalophthalimides and optionally polytetrafluoroethylene, to a process for the production of these moulding materials and to their use in the production of moulded bodies.

Aromatic polyesters are known: (W. M. Eareckson, J. Polym. Sci. XL, 399–406 (1959); Andre Conix, "Thermoplastic Polyesters from Bisphenols," Ind. Eng. Chem., Vol. 51. No. 2. 147-150. Febr. 1959; French Patent No. 1,177,517, U.S. Pat. No. 3,351,624 and German Auslegeschrift No. 1,445,384). Due to their outstanding characteristics, they are widely used where high dimensional stability under heat and high ductility are required.

Moulded parts produced from aromatic polyesters have favourable properties with regard to fire due to their high aromatic content: they do not flame easily and once ignited, continue to burn only slowly or are self-extinguishing. However, these combustion properties are not adequate for many uses.

A "VO" combustion property is required according to the standard test of Underwriters' Laboratories, Subj. 94, abbreviated in the following to UL-94. According to this standard test, test bodies (rods with dimenions of 127×12×3.2 or 1.6 mm) should have a maximum average afterburning time of 5 seconds.

The flameproofing agents which have previously been used either result in a reduction in colour stability of the melt or they substantially reduce the ductility or the weather resistance of the polycondensates.

Surprisingly, it has now been found that ammonium or alkali metal salts of inorganic or organic acids optionally admixed with halogenated phthalimides and polytetrafluoroethylene, exhibit, with aromatic polyesters and polyester carbonates, the same flame-retardant effect as approximately six times the quantity by weight of decabromodiphenyl ether, without the above-mentioned disadvantages also occurring.

The object of the invention is to provide flame-resistant moulding materials containing
(a) from 92 to 99.99, preferably from 97.5 to 99.8, parts by weight of thermoplastic aromatic polyesters or polyester carbonates based on diphenols, iso- and/or terephthalic acid or the halogenated or $C_1$–$C_4$-alkylated derivatives therof;
(b) from 0.01 to 3, preferably from 0.1 to 1, parts by weight of at least one ammonium resp. alkali salt of an inorganic or organic acid,
(c) from 0 to 3, preferably from 0.1 to 1, parts by weight of at least one halogenated phthalimide of the following formulae I or II:

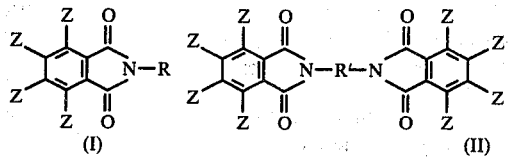

in which
R represents a hydrogen atom, $C_1$–$C_{10}$-alkyl radical, a phenyl radical, a naphthyl radical, or the group $C_6H_4X$, $C_6H_3X_2$, or $C_6H_2X_3$;
R' represents a single bond, an alkylene radical having from 2 to 4 carbon atoms, phenylene, or p-diphenylene;
Z represents chlorine or bromine and
X represents fluorine, chlorine or bromine; and
(d) from 0 to 2, preferably from 0 to 0.5 parts by weight of polytetrafluoro-ethylene.

Preferred moulding compositions according to the invention comprise
(a) from 92 to 99.98, preferably from 97.5 to 99.8, parts by weight of thermoplastic aromatic polyesters or polyester carbonates based on diphenols, iso- and/or terephthalic acid or the halogenated or $C_1$–$C_4$-alkylated derivatives thereof;
(b) from 0.01 to 3, preferably from 0.1 to 1, parts by weight of at least one ammonium or alkali salt of an inorganic or organic acid,
(c) from 0.01 to 3, preferably from 0.1 to 1, parts by weight of at least one halogenated phthalimide of the following formulae I or II:

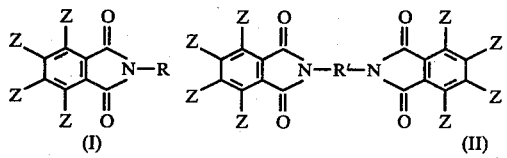

in which
R represents a hydrogen atom, a $C_1$–$C_{10}$-alkyl radical,
a phenyl radical, a naphthyl radical, or the group $C_6H_4X$, $C_6H_3X_2$ or $C_6H_2X_3$;
R' represents a single bond, an alkylene radical having from 2 to 4 carbon atoms, phenylene, or p-diphenylene;
Z represents chlorine or bromine and
X represents fluorine, chloride or bromine;
(d) from 0 to 2.5, preferably from 0 to 0.5 parts by weight of polytetrafluoroethylene.

It has been found that components (c) and (d) can be completely omitted, if particular salts (b) are selected:
Particularly preferred moulding compositions according to the invention comprise
(a) from 99 to 99.99, preferably from 99.6 to 99.9 parts, by weight, of one or more thermoplastic aromatic polyesters or polyester carbonates based on diphenols, iso- and/or tere-phthalic acid(s) or the halogenated or $C_1$–$C_4$ alkylated derivatives thereof; and
(b) from 0.01 to 1, preferably from 0.1 to 0.4, parts by weight of at least one ammonium or alkali metal salt of a perfluoroalkane sulphonic acid having from 1 to 10, preferably from 1 to 6 carbon atoms.

Another object of the invention is to provide a process for the production of these moulding materials, in which the components (a), (b) and optionally (c), (d) or other additives, are combined together, preferably in the melt.

A further object of the invention is the use of these moulding materials for the production of moulded bodies.

The aromatic polyesters and polyester carbonates (a) may contain radicals of monophenols, aromatic monocarboxylic acids and branching agents in addition to the radicals of diphenols and iso- or terephthalic acids.

They usually have relative viscosities of from 1.18 to 2.0, preferably from 1.2 to 1.5 (determined in a solution of 0.5 g polyester-(carbonate) in 100 ml of dichloromethane solution at 25° C.).

Diphenols which are preferred for the production of the polyesters and polyester carbonates (a) are compounds of the following formula:

HO—A—OH   (III)

A represents a divalent, mono or polynuclear aromatic radical having from 6 to 30 carbon atoms, which A is such that both hydroxyl groups are each directly linked to a carbon atom of an aromatic system.

Diphenols which are particularly preferred are compounds of the following formula:

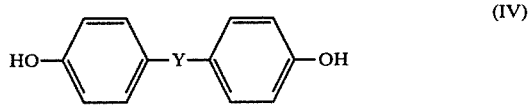

(IV)

in which
Y represents a single bond, an alkylene or alkylidene radical having from 1 to 7 carbon atoms,
a cycloalkylene or cycloalkylidene radical having from 5 to 12 carbon atoms, —O—, —S—,

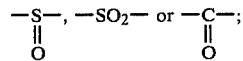

and the nuclear-alkylated and nuclear-halogenated derivatives thereof, e.g. hydroquinone,
resorcinol,
dihydroxydiphenyls,
bis-(hydroxyphenyl)-alkanes,
bis-(hydroxyphenyl)-cycloalkanes,
bis-(hydroxyphenyl)-sulphides,
bis-(hydroxyphenyl)-ethers,
bis-(hydroxyphenyl)-ketones,
bis-(hydroxyphenyl)-sulphoxides,
bis-(hydroxyphenyl)-sulphones and
α,α'bis-(hydroxyphenyl)-diisopropylbenzenes and the nuclear-alkylated and nuclear-halogenated derivatives thereof. These diphenols and others which can be used are described, for example, in U.S. Pat. Nos. 3,028,365; 3,275,601; 3,148,172; 3,062,781; 2,991,273; 3,271,367; 2,999,835; 2,970,131 and 2,999,846; German Offenlegungsschrift Nos. 1,570,703; 2,063,050; 2,063,052; 2,211,956 and 2,211,957; in French Pat. No. 1,561,518 and in the Monograph "H. Schnell, Chemistry and Physics of Polycarbonates, Interscience Publishers, New York, 1964".

The most important diphenols are listed below: bisphenol A[2,2-bis-(4,4-dihydroxy-diphenyl)-propane]; tetramethylbisphenol A; 1,1-bis(4-hydroxyphenyl)-isobutane; 1,1-bis(4-hydroxyphenyl)-cyclohexane; 4,4'-dihydroxydiphenylsulphide; 4,4'-dihydroxydiphenyl; 4,4'-dihydroxydiphenylsulphone and the di- and tetrahalogenated derivatives thereof. Bisphenol A is particularly preferred. Any mixtures of the diphenols mentioned above may also be used.

The following may be used as chain terminators for the aromatic polyesters and polyester carbonates (a); phenol, alkyl phenols with $C_1$-$C_{12}$-alkyl groups, halogenated phenols, hydroxydiphenyl, naphthols, chlorocarbonic acid esters of such phenolic compounds and chlorides of aromatic mono carboxylic acids which may be substituted by $C_1$-$C_{12}$-alkyl groups and halogen atoms.

The following may be used as branching agents for the aromatic polyesters and polyester carbonates (a); tri- or multi-functional carboxylic acid chlorides, such as trimesic acid trichloride, cyanuric acid trichloride, 3,3', 4,4'-benzophenone-tetracarboxylic acid tetrachloride, 1,4,5,8-naphthalinetetracarboxylic acid tetrachloride or pyromellitic acid tetrachloride, in quantities of from 0.01 to 1.0 mol % (based on the dicarboxylic acid derivatives used) or tri- or multi-functional phenols, such as phloroglucinol, 4,6-dimethyl-2,4,6-tri-(4-hydroxyphenyl)-heptene-2,4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis-(4-hydroxyphenyl)-cyclohexyl]-propane, 2,4-bis-(4-hydroxyphenyl-isopropyl)-phenol, tetra-(4[4-hydroxyphenyl-isopropyl]-phenoxy)-methane and 1,4-bis-[(4,4''-dihydroxytriphenyl)-methyl]-benzene, in quantities of from 0.01 to 1.0 mol% (based on the diphenols used).

The aromatic polyesters may be produced according to the transesterification process as described by V. V. Korshak and S. V. Vinogradova in "Polyesters", Pergamon Press (1965), 449 or by splitting off hydrogen chloride from the acid chlorides and the phenolic starting components in the melt, in solution or in the phase boundary surface process as described in German Offenlegungsschrift No. 2,714,544 and V. V. Korshak and S. V. Vinogradova in "Polyesters," Pergamon Press (1965), 469.

Phenolic branching agents may be present in admixture with the diphenols, and acid chloride branching agents may be introduced together with the acid chlorides.

The aromatic polyestercarbonates (a) and processes for their production are also known and are described in G. S. Kolesnikow et al, J. Polym. Science USSR. Vol. 9, 1967, P. 1705 to 1711; U.S. Pat. Nos. 2,030,331; 3,169,121; 3,409,704 and German Offenlegungsschrift Nos. 2,714,544 and 2,758,030.

Based on the total of ester and carbonate groups, aromatic polyestercarbonates (a) used according to the invention may contain up to 90 mol%, preferably up to 45 mol%, of carbonate groups.

Preferred salts (b) of inorganic acids are:
trisodium or tripotassium hexafluoroaluminate,
disodium or dipotassium hexafluorotitanate,
disodium or dipotassium hexafluorosilicate,
disodium or dipotassium hexafluorozirconate,
sodium or potassium pyrophosphate,
sodium or potassium metaphosphate, sodium or potassium tetrafluoroborate,
sodium or potassium hexafluorophosphate, and
sodium, potassium or lithium ortho-phosphate.

The following salts (b) of inorganic acids are particularly preferred:
  potassium hexafluoroaluminate,
  potassium pyrophosphate,
  potassium methylphosphonate,
  sodium hexafluoroaluminate,
  lithium phenylphosphonate.

Preferred salts (b) of organic acids are ammonium sodium or lithium salts, in particular potassium salts of organic sulphonic acids, phosphoric acids or carboxylic acids, whose organic radicals may be substituted by halogens, such as fluorine, chloride or bromine.

The following salts (b) or organic acids are particularly preferred:
  the ammonium sodium or potassium salts of perfluoroalkane sulphonic acids, particularly of perfluorobutane sulphonic acid and perfluoromethanesulphonic acid, but
  also of 2,5-dichlorobenzenesulphonic acid,
  2,4,5-trichlorobenzenesulphonic acid,
  (4-chlorophenyl)-phosphonic acid,
  methylphosphonic acid,
  (2-phenyl-ethylene)-phosphonic acid,
  pentachlorobenzoic acid,
  2,4,6-trichlorobenzoic acid,
  2,4-dichlorobenzoic acid and
  the lithium salt of phenylphosphonic acid.

All ammonium and alkali metal salts of organic and inorganic acids which do not exhibit significant decomposition in the extruder at temperatures of up to 380° C., preferably up to 330° C., under the conditions of the mixture, are suitable for use according to the invention as alkali metal salts (b). The best results are obtained using those salts (b) whose anion contains fluorine.

Preferred halogenated phthalimides (c) of formula I include the following:
  tetrachlorephthalimide,
  N-methyl-tetrachlorophthalimide,
  tetrabromophthalimide,
  N-ethyl-tetrachlorophthalimide,
  N-methyl-tetrabromophthalimide,
  N-propyl-tetrachlorophthalimide,
  N-ethyl-tetrabromophthalimide,
  N-isopropyl-tetrachlorophthalimide,
  N-isobutyl-tetrachlorophthalimide,
  N-butyl-tetrabromophthalimide,
  N-phenyl-tetrachlorophthalimide,
  N-isobutyl-tetrabromophthalimide,
  N-(4-chlorophenyl)-tetrachlorophthalimide,
  N-phenyl-tetrabromophthalimide,
  N-(3,5-dichlorophenyl)-tetrachlorophthalimide,
  N-(4-chlorophenyl)-tetrabromophthalimide,
  N-2,4,6-trichlorophenyl)-tetrachlorophthalimide,
  N-(3,5-dichlorophenyl)-tetrabromophthalimide,
  N-naphthyl-tetrachlorophthalimide,
  N-(2,4,6-trichlorophenyl)-tetrabromophthalimide and
  N-naphthyl-tetrabromophthalimide.

Preferred phthalimides (c) of formula II include the following:
  N,N'-ethylene-di-tetrachlorophthalimide,
  N,N'-propylene-di-tetrachlorophthalimide,
  N,N'-butylene-di-tetrachlorophthalimide,
  N,N'-p-phenylene-di-tetrachlorophthalimide,
  4,4'-di-tetrachlorophthalimido-diphenyl,
  N-(tetrachlorophthalimido)-tetrachlorophthalimide,
  N,N'-ethylene-di-tetrabromophthalimide,
  N,N'-propylene-di-tetrabromophthalimide,
  N,N'-butylene-di-tetrabromophthalimide,
  N,N'-p-phenylene-di-tetrabromophthalimide,
  N,N'-di-tetrabromophthalimido-diphenyl and
  N-(tetrabromophthalimido)-tetrabromophthalimide.

The following halogenated phthalimides (c) are particularly preferred: tetrachlorophthalimide, N-methyl-, and N-phenyl-tetrachlorophthalimide, N,N'-ethylene-di-tetrachlorophthalimide and N-(tetrachlorophthalimido)-tetrachlorophthalimide.

Mixtures of different halogenated phthalimides (c) of the formulae (I) or (II) may also be used.

The polytetrafluoroethylenes (d) usually have average molecular weights Mw of between $10^5$ and $10^6$. They are colourless solid substances which may be produced according to known processes, thus, for example, by polymerising tetrafluoroethylene in an aqueous medium using a free-radical-forming catalyst, for example sodium, potassium or ammonium peroxydisulphate, at a pressure of from 7 to 71 bars and at a temperature of from 0° to 200° C., preferably at a temperature of from 20° to 100° C.; as described for example, in U.S. Pat. No. 2,393,967.

The moulding materials according to the invention may contain stabilisers, flow and mould-removal agents, softeners and fillers such as glass fibres, glass balls, asbestos or carbon fibres, kieselguhr, kaolin, pulverised rock and pigments in addition to the flameproofing agents.

The combinations of flameproofing agent are preferably added to the aromatic polyesters and polyester carbonates in the melt, for example in an extruder, optionally together with auxiliary agents, fillers and reinforcing materials.

The moulding materials of the invention may be processed into moulded bodies according to conventional processes in injection moulding machines or may be processed into a semi-finished product in an extruder.

The percentages specified in the following Examples relate to weight, unless otherwise indicated.

EXAMPLES

A. Production of the polyesters and polyester carbonates

Polyester 1:
Production of an aromatic polyester from bisphenol A and equimolar quantities of iso- and terephthalic acid chloride.

9.12 kg of bisphenol A, 24 g of sodium borohydride and 150.4 g of phenol (4 mol %, based on bisphenol A) were dissolved in 7.52 kg of 45% sodium hydroxide and 160 liters of water under a nitrogen atmosphere. 148.4 g (1 mol %) of triphenylethyl phosphonium bromide were introduced into this solution and 60 kg of dichloromethane and 48 kg of chlorobenzene were then added.

A solution of 4141.2 g each of iso- and terephthalic acid dichloride in 12 l of dichloromethane were introduced into the vigorously-stirred two-phase mixture, with water cooling, over a period of 15 minutes at an internal temperature of from 20° to 25° C. and a pH value of from 12 to 13.

After the addition was completed, the mixture was stirred again for 15 minutes, the aqueous alkaline phase was then separated, the organic phase was washed initially with dilute phosphoric acid and then with water until the washing water had a conductivity of from 1 to $10^{-5}$ S/cm and most of the dichloromethane was distilled off under normal pressure (sump temperature up to approximately 100° C.).

The remaining solution which was still hot of the aromatic polyester 1 in chlorobenzene was freed from chlorobenzene to a residual content of approximately 50 ppm in a vacuum-double shaft extruder (screw diameter 32 mm) at approximately 0.014 bars and at 320° C., and the aromatic polyester 1 was drawn off as a strand and granulated.

Polyester 2:

Production of an aromatic polyester from bisphenol A and iso- and terephthalic acid in a mol ratio of 3:2

9.12 kg of bisphenol A and 24 g of sodium borohydride were dissolved in 7.52 kg of 45% sodium hydroxide and 160 l of water under a nitrogen atmosphere. 91 g of triethyl-benzyl-ammonium chloride were introduced into this solution and 60 kg of dichloromethane and 48 kg of chlorobenzene were then added.

A solution of 4968 g of isophthalic acid dichloride, 3312 g of terephthalic acid dichloride and 333 g of p-isooctyl phenol in 12 liters of dichloromethane was introduced into the vigorously stirred two-phase mixture with water cooling during 15 minutes at an internal temperature of from 20° to 25° C. and a pH value of from 12 to 13. Further processing was carried out as described for polyester 1.

Polyester carbonate 3:

Production of a polyester carbonate with 70 mol% of carbonester portion, statistically distributed, from bisphenol A and iso- and terephthalic acid chloride in a mol ratio of 1:1

2.736 kg of bisphenol A; 1.5 l of 45% aqueous sodium-hydroxide; 8.4 g of sodium borohydride; 120 g of triethyl benzyl ammonium chloride; 36 l of water; 11 l of dichloromethane and 11 l of chlorobenzene were introduced into a steel vessel provided with a high-speed stirrer, under a nitrogen atmosphere and the mixture was stirred until the bisphenol A dissolved completely.

A solution of 852.72 g of each iso- and terephthalic acid chloride and 39.5 g (3.5 mol%, based on bisphenol A) of phenol in 3 l of dichloromethane was introduced into the vigorously stirred two-phase mixture, with water cooling, over a period of 15 minutes and the mixture was then stirred for 1 hour. The temperature of the reaction mixture did not exceed 22° C. during this operation. The pH of the mixture was maintained at from 12 to 13 by adding sodium hydroxide.

600 g of phosgene were introduced while the mixture was stirred continuously, the temperatures again being maintained at approximately 20° C. and the pH at from 12 to 13. After the phosgene had been introduced, 120 ml of a 4% aqueous solution of triethylamine were added and the mixture was stirred again for another hour.

After separating the aqueous-alkaline phase, the organic phase was washed until it was free of salt, initially using dilute phosphoric acid and then using water, and approximately 50% of the dichloromethane was distilled off under normal pressure. The remaining solution was diluted with 15 l of chlorobenzene, the dichloromethane was continuously distilled off until the sump temperature was approximately 80° C., the polyester carbonate 3 was then freed from chlorobenzene in a vacuum extruder at 320° C., was drawn off as a strand and was granulated. The granulate had a relative solution viscosity $\eta_{rel}$ of 1.262.

Polyester carbonate 4

Production of a polyester carbonate with 90 mol% of carbon ester-portion in the form of blocks from bisphenol A and iso- and terephthalic acid chloride in a mol ratio of 1:1

As described for polyester carbonate 3, 2.736 g of bisphenol A, 1.5 l of 45% aqueous sodium hydroxide, 180 g of triethyl benzyl ammonium chloride, 8.4 g of sodium borohydride, 36 l of water, 11 l of dichloromethane and 11 l of chlorobenzene were stirred until the bisphenol A dissolved completely, a solution of 1096.38 g of each iso- and terephthalic acid chloride and 67.86 g of p.-tert.-butyl phenol (3.77 mol%, based in bisphenol A) in 3 l of dichloromethane was then introduced into the mixture with vigorous stirring over a period of 15 minutes. After the mixture had been stirred again for 1 hour, 215 g of phosgene were introduced over a period of 10 minutes. The pH value was maintained at from 12 to 13 using sodium hydroxide, as in the first stage of the reaction, and the temperature was maintained below 22° C. by cooling. The subsequent reaction lasted for 1 hour. No additional tertiary amine was used as catalyst. After the processing steps described for polyester carbonate 3, the relative solution viscosity of the granulate which was obtained was 1.248.

EXAMPLES 1–27

The combinations of flameproofing agents were worked into the polyesters 1 and 2 and into the polyester carbonates 3 and 4 in a double shaft extruder (screw diameter 32 mm) at approximately 300° C., and test rods having dimensions of 127×12.7×1.6 mm (1/16 inch) and 127×12.7×3.2 mm (⅛ inch) were produced from the mixtures obtained by the injection moulding process.

The fire properties of 10 test rods were examined according to UL, Subj. 94. The materials were allocated to the following 3 combustibility classes (flaming time 10 seconds) depending on the afterburning duration and dripping tendency of the test bodies:

Combustibility class

UL 94 V-0—The individual test bodies after-burn at the most for 10 seconds, and the whole set of 10 rods together after-burn at the most for 50 seconds. If molten material drips off from the burning rod, it does not ignite the padding layer.

UL 94 U-1—The individual test bodies after-burn at the most for 30 seconds, and the whole set of 10 rods together after-burn at the most for 250 seconds. Otherwise the same as for 94 V-0.

UL 94 V-2—After-burning times as for 94 V-1, but molten material which drips off can ignite the padding layer.

The compositions of the individual fireproofed materials and the results of the combustion tests may be seen in the following Table.

TABLE

Composition and assessment of the moulding materials; quantities in % by weight, based on the total of (a), (b), (c), and (d).

| | Example No. | No. of the polyester (carbonate) | Alkali salt quantity; type | halogenated phthalimide quantity; type | Polytetrafluoroethylene quantity | Assessment ⅛ inch UL 94 | Assessment 1/16 inch UL 94 | Notched impact strength acc. to DIN 53453: kJ/m² |
|---|---|---|---|---|---|---|---|---|
| Comparative experiments | 1 | 1; | 0.25; Na—hexafluoroaluminate | — | — | V-2 | V-2 | 21.3 |
| | 2 | 1; | — | 0.5; Tetrachloro-N—methylphthalimide | — | V-2 | V-2 | 20.5 |
| | 3 | 1; | — | — | 0.1 | V-2 | V-2 | 21.8 |
| | 4 | 1; | 0.25; Na—hexafluoroaluminate | 0.5; tetrachloro-N-13 methyl-phthalimide | 0.1 | V-0 | V-0 | 18.9 |
| | 5 | 1; | 0.25; Na—hexafluoroaluminate | 0.5; tetrachloro-N—methyl-phthalimide | — | V-0 | V-1 | 19.3 |
| | 6 | 2; | 0.2; K—hexafluorotitanate | 0.5; tetrachloro-N—methylphthalimide | — | V-0 | V-1 | 18.3 |
| | 7 | 2; | 0.2; K—hexafluorotitanate | 0.5; tetrachloro-N—methylphthalimide | 0.1; | V-0 | V-0 | 17.8 |
| | 8 | 2; | 0.3; K—phosphate | 0.5; tetrachloro-N—methylphthalimide | — | V-1 | V-1 | 18.5 |
| | 9 | 2; | 0.2; K—hexafluorosilicate | 0.5; N,N—ethylene-ditetrachlorophthalimide | — | V-1 | V-1 | 18.7 |
| | 10 | 21 | 0.3; disodium-methylphosphonate | — | — | V-2 | V-2 | 19.4 |
| | 11 | 2; | 0.3; disodium-methylphosphonate | 0.2; N,N—ethylene-ditetrachlorophthalimide | 0.1 | V-1 | V-1 | 20.3 |
| | 12 | 3; | 0.2; Na—2,5-dichlorobenzene-sulphonate | 0.6 tetrachloro-N—methylphthalimide | 0.1; | V-0 | V-0 | 16.2 |
| | 13 | 3; | 0.2; Na—2,4-dichlorobenzoate | 0.5; tetrachloro-N—methylphthalimide | 0.2; | V-0 | V-0 | 16.7 |
| | 14 | 3; | 0.3; K—metaphosphate | 0.5; tetrachloro-N—methylphthalimide | 0.1; | V-0 | V-0 | 17.1 |
| | 15 | 3; | 0.3; sodium-perfluorobutane-sulphonate | 0.5; tetrachloro-N—methylphthalimide | 0.1; | V-0 | V-0 | 16.1 |
| | 16 | 3; | 0.3; Li—phenyl-phosphate | 0.5; tetrachloro-N—methylphthalimide | 0.2 | V-0 | V-0 | 16.5 |
| | 17 | 4; | 0.3; K—tetrafluoroborate | 0.5; tetrachloro-N—methylphthalimide | 0.1; | V-0 | V-0 | 11.3 |
| | 18 | 4; | 0.1; K—tetrafluoroborate | 0.4; tetrachloro-N—methylphthalimide | 0.1 | V-0 | V-1 | 11.8 |
| | 19 | 4; | 0.3; Na—hexafluoroaluminate | 0.5; tetrachloro-N—methylphthalimide | 0.2; | V-0 | V-0 | 11.1 |
| | 20 | 1; | — | — | — | V-2 | V-2 | 22 |
| | 21 | 2; | — | — | — | V-1 | V-2 | 21.6 |
| | 22 | 3; | — | — | — | V-2 | V-2 | 17.3 |

| | Example No. | No. of the polyester (carbonate) | Alkali salt quantity; type | halogenated phthalimide quantity; type | Poly-tetra-fluoro-ethylene quantity | Assessment ⅛ inch UL 94 | Assessment 1/16 inch UL 94 | Notched impact strength acc. to DIN 53453: kJ/m². |
|---|---|---|---|---|---|---|---|---|
| | 23 | 4; | — | — | — | V-2 | V-2 | 12.7 |
| Comparative Examples | 24 | 1; | 6; | decabromodiphenylether | | V-0 | V-0 | 15.2 |
| | 25 | 3; | 6; | decbromodiphenylether | | V-0 | V-0 | 12.5 |
| | 26 | 1; | 3; | decabromodiphenylether | | V-1 | V-2 | 16.9 |
| | 27 | 3; | 3; | decabromodiphenylether | | V-1 | V-2 | 13.6 |

EXAMPLE 28

0.2% of potassium perfluorobutane sulphonate was worked into the polyesters 1 and 2 and into the polyester carbonates 3 and 4 respectively, in a double shaft extruder (screw diameter 32 mm) at about 320° C., and test rods having dimensions of 127×12.7×1.6 mm (1/16 inch) and 127×12.7×3.2 mm (⅛ inch) were produced from the resulting mixtures by an injection moulding process.

The behaviour in fire of 10 test rods was examined according to UL, Subj. 94.

All the resins and both rod thicknesses resulted in the behaviour in fire of V-O.

We claim:

1. Flame resistant moulding materials containing:
   (a) from 92 to 99.98 parts by weight of thermoplastic aromatic polyester or polyester carbonate containing up to 45 mole percent of carbonate moieties based on the total of ester and carbonate moieties and said polyester or polyestercarbonate being based on diphenols, isophthalic acid or terephthalic acid, each of which is unsubstituted or substituted by halogen or alkyl having 1 to 4 carbon atoms;
   (b) from 0.01 to 3 parts by weight of at least one inorganic acid salt or organic acid salt wherein said inorganic acid salts are trisodium hexafluoroaluminate, tripotassium hexafluoroaluminate, disodium hexafluorotitanate, dipotassium hexafluorotitanate, disodium hexafluorosilicate, dipotassium hexafluorosilicate, disodium hexafluorozirconate, dipotassium hexafluorozirconate, sodium pyrophosphate, potassium pyrophosphate, sodium metaphosphate, potassium metaphosphate, sodium tetrafluoroborate, potassium tetrafluoroborate, sodium hexafluorophosphate, potassium hexafluorophosphate, sodium ortho-phosphate, potassium ortho-phosphate, or lithium ortho-phosphate, and said organic acid salts are alkali metal or ammonium salts of organic sulphonic acids, phosphonic acids or carboxylic acids with organic moieties being unsubstituted or substituted by halogen;
   (c) from 0.01 to 3 parts by weight of at least one halogenated phthalimide of the formula

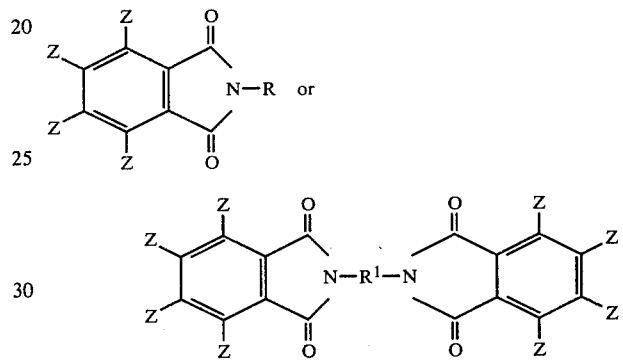

wherein
   R is hydrogen, alkyl having 1 to 10 carbon atoms, phenyl, naphthyl, C₆H₄X, C₆H₃X₂ or C₆H₂X₃;
   X is fluoro, chloro or bromo;
   R¹ is a single bond, alkylene having 2 to 4 carbon atoms, phenylene or p-diphenylene; and
   Z is chloro or bromo; and
   (d) from 0 to 2.5 parts by weight of polytetrafluoroethylene.

2. Moulding materials according to claim 1, characterised in that they contain from 97.5 to 99.8 parts by weight of component (a), from 0.1 to 1 part by weight of component (b), from 0.1 to 1 part by weight of component (c), and from 0 to 0.5 parts by weight of component (d).

3. Moulding materials according to claim 1 wherein component (b) contains 0.01 to 1 part by weight of at least one ammonium or alkali metal salt of a perfluoroalkane sulphonic acid having 1 to 10 carbon atoms.

4. Moulding materials according to claim 3 wherein component (b) is an ammonium or potassium salt of perfluorobutane sulphonic acid or perfluoromethane sulphonic acid.

5. Moulding compositions according to claim 3, characterised in that they contain 99.6 to 99.8 parts by weight of component (a) and 0.1 to 0.4 parts by weight of component (b).

6. Molding materials according to claim 1 wherein component (a) has a relative viscosity of from 1.18 to 2 measured as a solution of 0.5 gram in 100 ml. of dichloromethane at 25° C.

* * * * *